May 21, 1963   C. E. BOWERS, SR   3,090,046
ADJUSTABLE HEADBAND
Filed May 17, 1961

INVENTOR.
CHARLES E. BOWERS, SR.
BY Robertson and Youtie

ATTORNEYS

United States Patent Office 3,090,046
Patented May 21, 1963

3,090,046
ADJUSTABLE HEADBAND
Charles E. Bowers, Sr., Moylan, Pa., assignor to The Fibre-Metal Products Company, Chester, Pa., a corporation of Pennsylvania
Filed May 17, 1961, Ser. No. 110,684
4 Claims. (Cl. 2—8)

This invention relates to adjustable headbands, and is especially concerned with such headbands as are adapted to be employed in welding helmets, shields and other headgear.

In prior adjustable headbands, such as disclosed in Bowers 2,205,741, the headband strip was fabricated of fiber, plastic or other suitable headband material, and gear teeth were formed of the strip material for meshing engagement with an operating gear element to effect extension and contraction of the headband. In use, it has been found that this formation of gear teeth from the plastic or fiber material of the headband strip was not entirely satisfactory, as such teeth could not, within the design limitations, be made sufficiently strong to withstand tooth pressures occurring under all conditions of use. This sometimes resulted in sheared or otherwise damaged teeth, and consequent inoperativeness of an adjustable headband over its entire range of adjustability.

Accordingly, it is one object of the present invention to provide a headband construction of the type described wherein the gear teeth are sufficiently strong to resist damage under all possible conditions of use, without departing from strict design limitations on size, weight, and cost.

It is another object of the present invention to provide a unique construction in an adjustable headband wherein a headband strip may be fabricated almost entirely of a lightweight, flexible plastic material, to achieve the advantages thereof, and wherein a toothed member may be fixedly anchored in the headband strip, to achieve the desired tooth strength and durability in a relatively inexpensive manner.

It is still a further object of the present invention to provide a headband construction having the advantageous characteristics mentioned in the preceding paragraphs which is extremely simple and sturdy in structure, entirely reliable in use, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
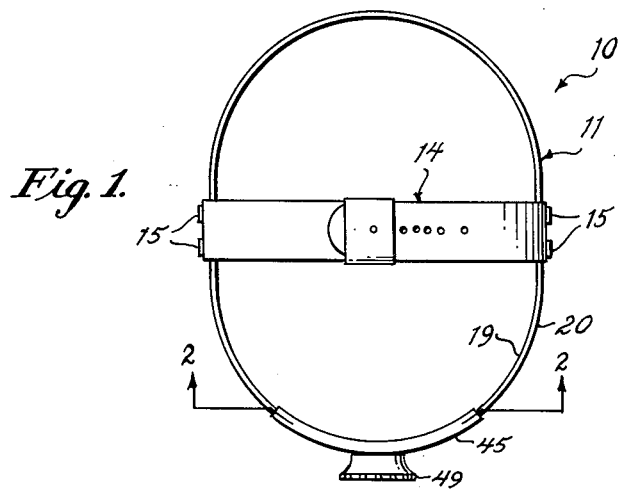
FIGURE 1 is a top plan view showing an adjustable headband constructed in accordance with the teachings of the present invention.
Figure 2:
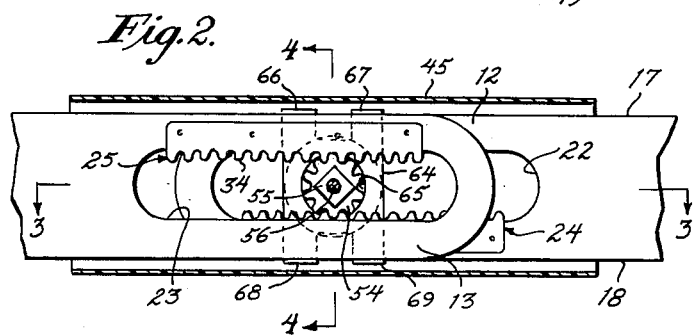
FIGURE 2 is an enlarged sectional view taken substantially along the line 2—2 of FIGURE 1.

Referring now more particularly to the drawings, and specifically to FIGURE 1 thereof, the headband is there generally designated 10, and includes a strip 11 adapted to extend generally horizontally about a wearer's head. The strip 11 is advantageously fabricated of stiff, but flexible material, normally disposed with its width generally vertical, and having its end portions in facing, overlapping relation, as at 12 and 13 in FIGURES 2 and 3. A crosspiece 14 may extend between and have its opposite ends connected, as by fasteners 15 to opposed regions of the strip 11, to pass over the top of a wearer's head.

The strip 11 is advantageously integrally fabricated of a plastic material having the desired flexibility and stiffness, and resistance to moisture, warping and deterioration. In practice, the strip 11 may be of a substantially constant cross-sectional configuration, so as to have a substantially constant width, as between its upper and lower edges 17 and 18, and a substantially constant thickness, as between its inner and outer faces 19 and 20. If desired, suitable provision may be made for the attachment of a welding helmet, shield or other equipment.

Formed in the overlapping end portions 12 and 13 of strip 11 may be generally ovaloid openings 22 and 23, respectively, which may extend longitudinally of the strip being spaced laterally between the side edges 17 and 18. Fixedly secured to the end portions 12 and 13 are toothed racks 24 and 25, respectively. The toothed rack 24 of strip end portion 12 is located in spaced, generally facing relation with respect to the toothed rack 25 of strip end portion 13; and more specifically, the teeth of each rack 24 and 25 extend toward and terminate short of the teeth of the other rack.

Figures 6, 7:
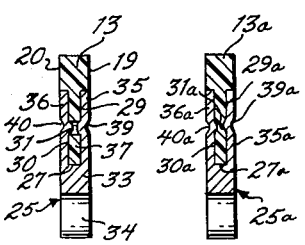
FIGURE 6 is a partial sectional view taken substantially along the line 6—6 of FIGURE 5.
FIGURE 7 is a sectional view similar to FIGURE 6, but showing a slightly modified embodiment.
Figure 5:
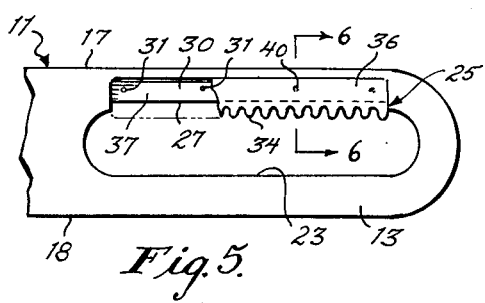
FIGURE 5 is an elevational view showing one end portion of a headband strip of the instant invention, partly broken away for clarity of understanding.

As the construction of each end portion 12 and 13 and its associated toothed rack 24 and 25 may be substantially identical, it will suffice to illustrate and described a single strip end portion 13, as seen in FIGURES 5 and 6. It will there be observed that the longitudinal cutout or opening 23 is located medially between the upper and lower edges 17 and 18. Further, the opening 23 has its upper bounding edge 27 substantially straight, extending longitudinally of the strip 11, and of a length equal to the length of toothed rack 25. Formed on the inner and outer faces 19 and 20 of the strip end portion 13 adjacent to the longitudinal edge 27 are recesses 29 and 30. The recesses 29 and 30 may be substantially congruent, each being of a rectangular configuration elongate longitudinally of the strip 11. Further, each of the recesses 29 and 30 may have one longitudinal side opening downward at the longitudinal edge 27, having its remaining three sides closed or bounded by the material of the strip end portion. The material of strip end portion 13 may be formed with a plurality of openings or holes 31 opening into the recesses 29 and 30.

The toothed rack 25 is advantageously fabricated of light-weight metal, such as aluminum or the like, including a longitudinally extending elongate or bar portion 33 having teeth 34 projecting from one side thereof, the lower side as seen in the drawings. The bar portion 33 is arranged to extend along, below and in contact with the longitudinal edge 27, with the teeth 34 depending into the opening 23. Formed integral with the bar portion 33, and longitudinally coextensive therewith, being flush with opposite sides thereof, are a pair of upwardly extending, spaced extensions or embracing strips 35 and 36. The extensions or embracing pieces 35 and 36 are of generally rectangular configuration, being respectively, snugly conformably received in the recesses 29 and 30. As seen in FIGURE 6, the bar portion 33 and extensions 35 and 36 combine to define a generally U-shaped cross-sectional configuration receiving and embracingly engaging the recessed strip portion 37 along the edge 27. It will also be there observed that the thickness of the extensions 35 and 36 is substantially equal to the depth of the recesses 29 and 39, so that the extensions are substantially flush with the regions of the strip faces 19 and 20 proximate to the recesses. In order to firmly secure and anchor the toothed rack 25 in the illustrated position, longitudinally spaced portions 39 and 40 of the extensions 35 and 36 may be punched or upset into the openings 31, as best seen in FIGURE 6.

In this condition, the toothed rack 25 is positively anchored in position to the strip end portion 13, with the teeth 34 projecting downward. The strip end portion 12 may be provided with the same longitudinal edge and recessed structure as described hereinbefore in connection with the end portion 13, as by molding or other suitable means, but such structure is located along the lower region of opening 22 for cooperating relation with the rack 24 which has its teeth projecting upward toward and in spaced, generally facing relation with the teeth of rack 25. Thus, the entire structure of end portion 12 may be substantially identical to that of end portion 13, but inverted with respect to the latter.

Slidably receiving and surrounding the strip end portions 12 and 13 is an open-ended guide tube or case 45. The guide tube or case 45 may be of generally rectangular cross-sectional configuration, slidably, conformably receiving the strip end portions 12 and 13, and arcuate or bowed for conforming engagement with a wearer's head. The guide case or tube 45 is formed on its external, outwardly convex side with a through hole 46 opening into the interior of the tube. An external flange 47 may be formed on the outer side of the guide tube 45 extending in outwardly spaced relation about the through opening or hole 46.

The opening 46 of the tubular case 45 is generally in alignment with the overlapping openings 22 and 23 of the strip end portions 12 and 13. An external manually actuable member or knob 49 is located outward of the tubular case 45 and is formed with a boss 50 extending rotatably inwardly through the opening 46 of case 45. Surrounding the inwardly extending boss 50, the knob 49 may be formed with an annular recess 51, which may have its bottom surface of undulant or serrated formation. An annular flange 52 is formed on the knob 49 extending circumferentially about the recess 51 and rotatably encompasses the annular flange 47 of the case.

Figure 4:
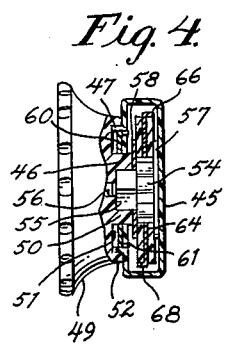
FIGURE 4 is a sectional elevational view taken substantially along the line 4—4 of FIGURE 2.
Figure 3:
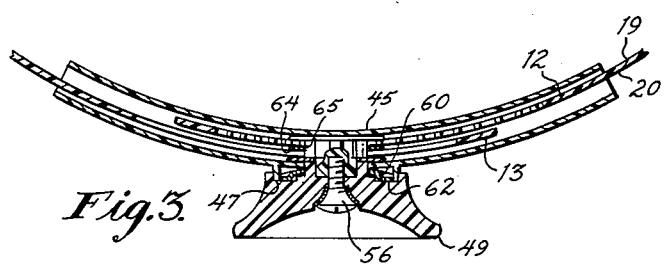
FIGURE 3 is a sectional view taken substantially along the line 3—3 of FIGURE 2.

A toothed rotary element or spur gear 54 is located in the openings 22 and 23 of the overlapping end portions 12 and 13, having its teeth in meshing engagement with both of the toothed racks 24 and 25. A boss 55 extends axially from one side of the gear element 54 into nonrotatable engagement in the boss 50 of knob 49 for fixed securement to the latter by a threaded screw 56, or other suitable fastener. On the other, inner side of the gear element 54 there may be formed an integral enlargement or retainer disc 57, of a diameter greater than that of the gear element and located between the inner wall of the tube 45 and the inner strip end portion 12. A washer or spacer 58 may be rotatably circumposed about the boss 55 and of a diameter generally equal to that of retainer disc 57 for retaining engagement with the outer side of outer strip end portion 13. A resilient annular plate or detent 60 is circumposed about the boss 50, and may include lugs 61 engageable in the outer wall of tube 45 to prevent rotation of the detent. The lugs 61 may be seen in FIGURE 4. In FIGURE 3 are shown upset portions 62 of the detent plate 60 resiliently, releasably engageable with the undulant surface of recess 51 to releasably retain the knob 49 in a selected position of rotation.

A guide plate 64 may be of generally H-shaped configuration, interposed between the ovelapping strip end portions 12 and 13, and formed with a central through opening 65 rotatably receiving the gear element 54. The upper ends of the guide plate 64, see FIGURES 2 and 4, may be bent inward and outward, as at 66 and 67, respectively, to overlie the upper edges of respective strip end portions 12 and 13. Similarly, the respective lower ends of the guide plate 64 may be bent outward and inward, as at 68 and 69 to underlie the lower edges of strip end portions 13 and 12. Thus, each upright of the H-shaped guide plate 64 has its upper and lower ends bent in opposite directions, so that diagonally opposed upright end portions engage the upper and lower edges of the same strip end portion. By this construction, the guide plate 64 defines a channel for slidably receiving and guiding both strip end portions 12 and 13.

Thus, the strip end portions 12 and 13 are constrained to relative longitudinal movement in their facing relation, which movement is effected by rotation of the knob 49 to rotate gear element 54 in meshing engagement with the racks 24 and 25. Of course, the retainers 57 and 58 hold the strip end portions 12 and 13 in proper facing relation and assure meshing engagement of the gear element and racks.

In the embodiment of FIGURE 7, there is shown a strip end portion 13a which is similar in all respects to the strip end portion 13, except that the through openings or holes 31 are omitted. Thus, the strip end portion 13a is formed with a longitudinal edge 27a having its adjacent regions recessed on opposite faces of the strip end portion, as at 29a and 30a.

A rack 25a may extend along the longitudinal edge 27a and have a pair of extensions 35a and 36a respectively conformably engaged in the recesses 29a and 30a. Insuring firm anchorage of the rack 25a in position along the edge 27a, there may be formed indentations or upset portions 39a and 40a, as by a punch or suitable die. The upset portions 39a and 40a may conformably deform the intermediate region 31a of the strip portion 13a for positive securement of the rack to the strip portion.

From the foregoing, it is seen that the present invention provides an adjustable-headband construction of the type described which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An adjustable headband comprising a stiff flexible non-metallic strip of substantially constant thickness and having overlapping end portions, said end portions being formed with substantially straight longitudinal edges in spaced generally facing relation with each other and each end portion being formed with recesses on opposite faces in the region adjacent to and opening through the respective longitudinal edge, guide means slidably receiving said end portions and constraining the latter to relative longitudinal movement, a substantially straight metallic toothed rack extending along and in engagement with each of said longitudinal edges with the teeth of each rack extending toward and spaced from the teeth of the other rack, each of said racks having a thickness approximately equal to that of the adjacent end portion and having its sides substantially flush with the adjacent end-portion faces, a pair of integral metallic extensions on each of said racks extending conformably into the adjacent recesses for fixed embracing engagement with the adjacent end portion, each of said metallic extensions substantially completely filling a respective recess and being substantially flush with the adjacent side of the associated rack and adjacent end-portion face, for fixed securement of each rack to its respective end portion without projection beyond the end-portion faces for unobstructed relative longitudinal movement of the end portions, and a gear element rotatably mounted in said guide means and in meshing engagement with both of said racks, for effecting relative longitudinal movement of said strip end portions.

2. An adjustable headband according to claim 1, each of said pair of extensions being substantially longitudinally coextensive with its respective rack and having longitudinally spaced portions anchored to the embraced strip end portion for fixed securement thereto.

3. An adjustable headband according to claim 2, said recesses each being of an elongate configuration and opening at the adjacent longitudinal edge, the remainder of each recess being closed by the material of the respective strip end portion and in bounding engagement with the received extension.

4. An adjustable headband according to claim 2, said extensions being metallic and of integral one-piece construction with the respective rack.

References Cited in the file of this patent
UNITED STATES PATENTS

| | | |
|---|---|---|
| 2,550,575 | Malcom | Apr. 24, 1951 |
| 3,013,440 | White | Dec. 19, 1961 |